(12) United States Patent
Giudice

(10) Patent No.: US 10,753,524 B2
(45) Date of Patent: Aug. 25, 2020

(54) MANIPULATOR APPARATUS FOR PROCESSING PRESSURE VESSELS

(71) Applicant: ROLLS-ROYCE POWER ENGINEERING PLC, Derby (GB)

(72) Inventor: Sebastiano D. Giudice, Market Harborough (GB)

(73) Assignee: Rolls-Royce plc, London ( * ) Notice: Subject to any disclaimer, the term of this patent is extended or adjusted under 35 U.S.C. 154(b) by 0 days.

(21) Appl. No.: 16/367,394

(22) Filed: Mar. 28, 2019

(65) Prior Publication Data
US 2019/0316727 A1 Oct. 17, 2019

(30) Foreign Application Priority Data
Apr. 13, 2018 (GB) .................................. 1806071.5

(51) Int. Cl.
*F16L 55/30* (2006.01)
*F17C 13/02* (2006.01)
(Continued)

(52) U.S. Cl.
CPC .............. *F16L 55/30* (2013.01); *F17C 13/02* (2013.01); *F16L 2101/12* (2013.01);
(Continued)

(58) Field of Classification Search
CPC ... F16L 55/30; F16L 2101/12; F16L 2101/30; F16L 2101/50; F17C 13/02; F17C 2250/0491; F16H 19/06
See application file for complete search history.

(56) References Cited

U.S. PATENT DOCUMENTS 2,490,035 A * 12/1949 Deakin .................... F16H 19/06
74/37
2,785,941 A * 3/1957 Sutherland .............. F16H 19/06
346/8
(Continued)

FOREIGN PATENT DOCUMENTS

CN 107175642 9/2017
CN 206605517 11/2017
(Continued)

OTHER PUBLICATIONS

"Laser Pulley Alignment Setup & Operating Instructions." Sieffert Industrial., www.seiffertindustrial.com/laser-pulley-alignment-setup, Accessed Jan. 24, 2019.
(Continued)

*Primary Examiner* — Michael E Gallion
(74) *Attorney, Agent, or Firm* — Barnes & Thornburg LLP

(57) ABSTRACT

Apparatus for moving one or more processing devices relative to an object to be processed, comprising: first and second mounting units configured to be secured in a fixed position relative to the object to be processed and between which one or more tension members are mounted under tension; one or more carriages respectively connected to the one or more tension members, each of the carriages configured to accommodate a respective processing device; and a drive unit configured to move the one or more tension members so as to move the one or more carriages relative to the object.

19 Claims, 1 Drawing Sheet

(51) Int. Cl.
*F16L 101/12* (2006.01)
*F16L 101/30* (2006.01)
*F16L 101/50* (2006.01)

(52) U.S. Cl.
CPC ....... *F16L 2101/30* (2013.01); *F16L 2101/50* (2013.01); *F17C 2250/0491* (2013.01)

(56) References Cited

U.S. PATENT DOCUMENTS

| | | | | |
|---|---|---|---|---|
| 3,603,264 A | * | 9/1971 | Von Arx | G01M 3/005 104/138.2 |
| 3,710,726 A | * | 1/1973 | Buchholz | B61B 12/02 104/112 |
| 3,761,623 A | * | 9/1973 | Hara | F16L 55/32 348/84 |
| 3,945,508 A | * | 3/1976 | Colin | B63B 27/18 414/138.4 |
| 3,976,202 A | * | 8/1976 | Bauvin | B66C 11/16 212/322 |
| 4,420,886 A | * | 12/1983 | Amano | G06K 15/22 33/1 M |
| 4,666,127 A | * | 5/1987 | Allen | B63B 27/18 254/281 |
| 9,096,294 B1 | * | 8/2015 | Dong | B63B 27/32 |
| 9,847,045 B2 | * | 12/2017 | Campolo | A61H 1/0274 |
| 2002/0003173 A1 | | 1/2002 | Bauer et al. | |
| 2005/0017228 A1 | * | 1/2005 | Werner | B63B 27/18 254/278 |
| 2007/0004567 A1 | * | 1/2007 | Shetty | A61H 3/008 482/69 |
| 2009/0155039 A1 | * | 6/2009 | Dujardin | B25J 9/026 414/681 |

FOREIGN PATENT DOCUMENTS

| | | |
|---|---|---|
| JP | S56118694 A | 9/1981 |
| JP | 2001305286 | 10/2001 |
| WO | 9702931 | 1/1997 |

OTHER PUBLICATIONS

Great Britain search report dated Oct. 15, 2018, issued in GB Patent Application No. 1806071.5.
Extended EP Search Report dated Jun. 21, 2019 and issued in connection with EP Appln. No. 19162499.8.

* cited by examiner

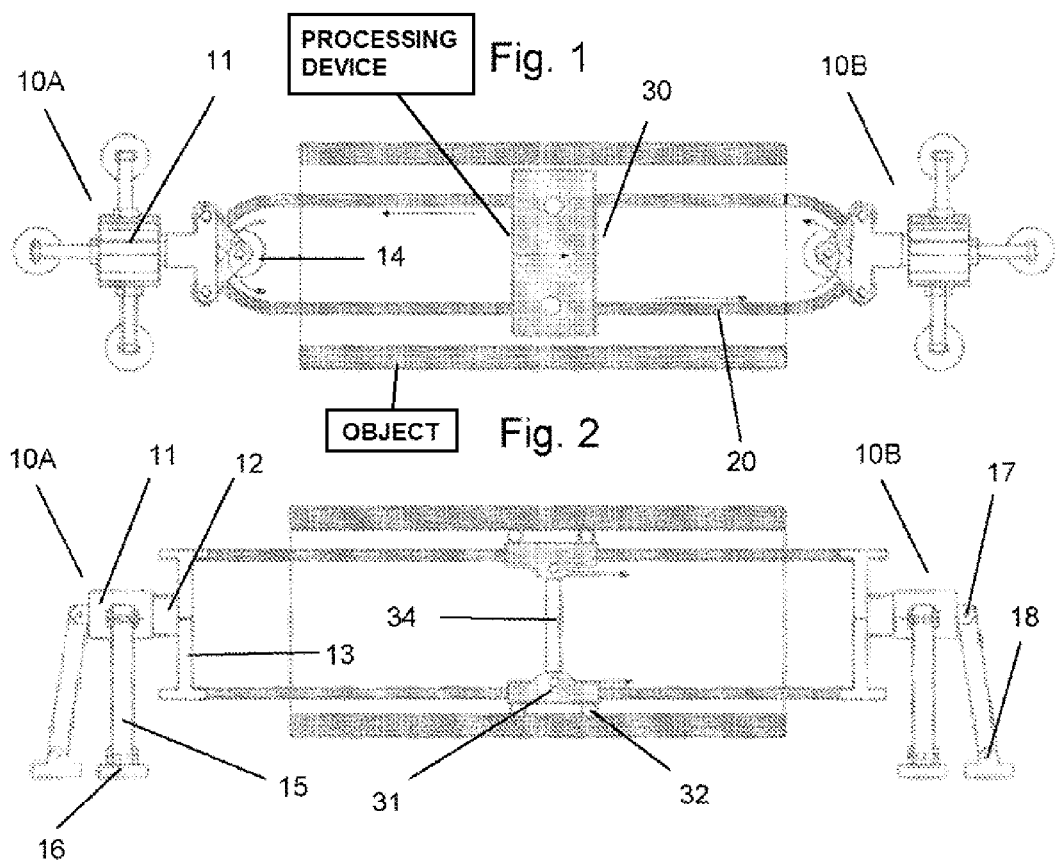
Fig. 1
Fig. 2
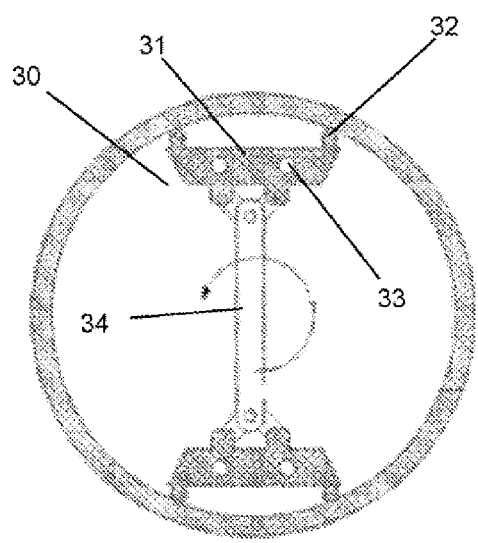
Fig. 3
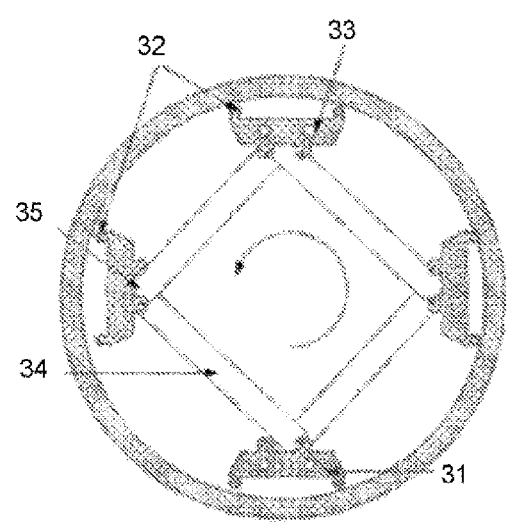
Fig. 4

MANIPULATOR APPARATUS FOR PROCESSING PRESSURE VESSELS

CROSS-REFERENCE TO RELATED APPLICATIONS

This application is based upon and claims the benefit of priority from British Patent Application Number 1806071.5 filed 13 Apr. 2018, the entire contents of which are incorporated by reference.

BACKGROUND

Technical Field

The present disclosure relates to an apparatus for moving one or more processing devices relative to an object to be processed. In particular, the disclosure may relate to such apparatuses (also known as manipulators) for processing pressure vessels or parts of pressure vessels used in the nuclear industry, for example.

Description of the Related Art

The surfaces of objects such as pressure vessels need to be cleaned and inspected throughout their manufacture. This may be done manually or using mechanised or automated apparatuses known as manipulators. Manipulators move processing devices, such as cleaning devices for cleaning or sensors for inspection, around the surface of the object.

Known manipulators may comprise a mounting ring mounted on the outer cylindrical surface of the object. The mounting ring may allow a sensor for example to move along tracks on the mounting ring. However, for very large objects, such as large pressure vessels, large manipulators are required. These may be difficult to make and install. Furthermore, the mounting ring only fits a specific object so cannot be used for other types of object.

SUMMARY

A first aspect provides an apparatus for moving one or more processing devices relative to an object to be processed, comprising: first and second mounting units configured to be secured in a fixed position relative to the object to be processed and between which one or more tension members are mounted under tension; one or more carriages respectively connected to the one or more tension members, each of the carriages configured to accommodate a respective processing device; and a drive unit configured to move the one or more tension members so as to move the one or more carriages relative to the object.

Optionally, the drive unit comprises: one or more first drive units configured to respectively drive the one or more tension members from one mounting unit towards the other mounting unit to move the carriages in a first direction.

Optionally, each of the tension members are arranged in a loop around respective parts of the first and second mounting units, the first drive units being configured to drive the tension members such that the tension members move around the loop.

Optionally, each first drive unit comprises a drive pulley forming part of one of the first or second mounting units and a respective tension member is looped around the drive pulley.

Optionally, each carriage is supported by two parts of a respective tension member, each of the two parts being on opposite sides of the loop formed by the tension member, the carriage being fixedly connected to only one of the two parts.

Optionally, the first and second mounting units comprise respective rotatable portions mounted so as to be rotatable about an axis extending from one mounting unit towards the other mounting unit; the one or more tension members are mounted to the rotatable portions; and the drive unit comprises one or more second drive units configured to rotate the rotatable portions about the axis.

Optionally, multiple carriages are arranged at intervals around an axis extending from one mounting unit towards the other mounting unit.

Optionally, each of the carriages is connected to at least one other of the multiple carriages by a rigid connector. Optionally, the rigid connector is connected to each carriage by a pivoting and/or gimballed connection. Optionally, the rigid connector is a bar or rod.

Optionally, each of the multiple carriages is connected to at least one respective tension member. Alternatively, optionally, one or more of the multiple carriages are not directly connected to respective tension members and are connected to at least one carriage which is connected to a respective tension member.

Optionally, the drive unit is configured to drive the multiple carriages in the same direction at the same speed.

Optionally, the one or more carriages comprise at least one bearing configured to contact a surface of the object to be processed as the one or more carriages are moved relative to the object.

Optionally, the one or more tension members each comprise one of: cables, wires, belts and cords.

Optionally, the first and second mounting units are configured to be mounted on the object to be processed.

Optionally, each processing device comprises one of: a reflector, a sensor or a cleaning device.

A second aspect provided a method of processing an object with a processing device, comprising arranging the apparatus of any one of claims 1 to 17 adjacent the object; moving the one or more carriages, such that the carriages move relative to the object; processing the object using the processing device.

Optionally, the surface is an interior surface of a hollow object. Optionally, the apparatus is arranged such that the tension members pass through the object.

Optionally, the carriages contact a surface of the object.

Optionally, the object is a pressure vessel.

DESCRIPTION OF THE DRAWINGS

FIG. 1 shows a plan view of an apparatus;
FIG. 2 shown a side view of the apparatus of FIG. 1;
FIG. 3 shows a cross sectional front view of an example apparatus; and
FIG. 4 shows a cross sectional front view of another example apparatus.

DETAILED DESCRIPTION

FIGS. 1 and 2 show an example apparatus for moving one or more processing devices relative to an object to be processed. The object to be processed may be a hollow object. The interior surface of the hollow object may be processed. The object may have a substantially cylindrical shaped surface, for example. The object may be a pipe, a pressure vessel or parts thereof, for example. The processing device may be a reflector (e.g. for making measurements using a laser), a sensor, a visible inspection probe, a laser or a $CO_2$ cleaning device.

In this example, the apparatus comprises first and second mounting units 10A, 10B. The mounting units 10A, 10B are configured to be secured in a fixed position relative to the object to be processed. Between the first and second mounting units 10A, 10B, two tension members 20 in the form of cables are mounted under tension. A carriage 30 is connected to each tension member 20. The carriages 30 are configured to accommodate a respective processing device (not shown in the Figures). The apparatus further comprises a drive unit configured to move the tension members 20, so as to move the carriages 30 connected thereto.

In other examples, the tension members 20 may not be cables. For example, the tension members 20 may be belts, wires or cords, or any other suitable member that is flexible and can be held under tension. Further, in other examples, a different number of tension members 20 may be mounted between the first and second mounting units 10A, 10B. For example, one, three, four or more tension members 20 may be mounted between the first and second mounting units 10A, 10B.

The mounting units 10A, 10B are configured to hold the tension members 20 under tension. This tension supports the carriages 30 allowing them to be positioned against a surface of an object so that the processing device can process the surface of the object.

In the example shown in FIGS. 1 and 2, the tension members 20 are arranged in a loop around respective parts of the first and second mounting units 10A, 10B. In particular, the tension members are looped around respective pulleys 14 of the first and second mounting units 10A, 10B. The loop shown in FIGS. 1 and 2 has an elongate shape with two opposite sides of the loop running substantially parallel to each other.

In the example apparatus, a first drive unit is configured to drive a tension member 20 from one mounting unit 10A, 10B towards the other mounting unit 10B, 10A. This moves a carriage 30 associated with the tension member 2 in a first direction. The first direction is the direction from one mounting unit 10A, 10B to the other mounting unit 10B, 10A. In this example, two tension members 20 are provided, so two respective first drive units are provided. Each of the respective first drive units may be configured to independently drive the carriages 30 in the same direction at the same speed.

More specifically, in this example, the tension members 20 are provided in a loop, so the first drive units are configured to drive the tension members 20 around their respective loops. For example, the first drive unit may comprise one (or both) of the pulleys 14, as a drive pulley for driving the tension member 20 around the pulley arrangement.

In other examples, alternatives to the looped tension member and pulley arrangement are possible. For example, one or more linear tension members may be provided and configured to be wound reel-to-reel between respective reels of the first and second mounting units 10A, 10B. In this case, drive units would drive the reels to move the carriages.

The mounting units 10A, 10B in the example shown in FIGS. 1 and 2 will now be described in further detail. Each mounting unit 10A, 10B comprises a main body 11, connected via a shaft 12, extending in an axial direction from the main body 11, to arms 13 extending in a radial direction from the shaft 12. The tension members 20 are mounted to the arms 13, which in this example comprise the pulleys 14 described above. Also connected to the main body 11 are legs 15 and feet 16, at the distal ends of the legs 15, for supporting the main body 11.

The first and second mounting units 10A, 10B comprise respective rotatable portions mounted to be rotatable about an axis extending from one mounting unit 10A, 10B towards the other mounting unit 10B, 10A. The one or more tension members 20 are mounted on the rotatable portions. In this example, each rotatable portion comprises the shaft 12 and arms 13. The shaft 12 extends in a direction (axial direction) extending from one mounting unit 10A, 10B towards the other mounting unit 10B, 10A and is configured to rotate about an axis through the centre of the shaft 12. The shaft 12 may be cylindrical in shape.

The arms 13 extend radially away from the shaft 12. The arms 13 may extend substantially perpendicularly to the axis of the shaft 12, as shown in FIG. 2. However, other arrangements are possible, for example, the arms 13 may extend obliquely to the axis of the shaft 12. In some examples, the arms 13 may be adjustable in length. The arms 13 may be configured to be adjusted manually or using an additional drive unit to extend and shorten the arms 13.

Multiple arms 13 may extend from the shaft 13 for supporting tension members 20 thereon. In the example, two arms 13 are provided. However, in other examples, one, three, four or more arms 13 may be provided. In the case of multiple arms 13, the arms may be arranged around the axis of the shaft 12 at regular intervals. For example, in FIG. 2 the two arms 13 extend from diametrically opposites sides of the shaft 12. In another example having three arms 13, the three arms 13 may be arranged at 120 degree intervals around the shaft 12.

Each of the arms 13 is configured to support a tension member 20. In the example shown in FIG. 1, the arms 12 comprise a pulley 14 at a distal end thereof (opposite the shaft 12), around which a tension member 20 is looped. As shown in FIG. 1, the pulley 14 may be arranged on the arm 14 such that the rotational axis of the pulley 14 is substantially in a radial direction with respect to the axis of the shaft 12. However, alternative arrangements may be used in other examples.

The drive unit of the apparatus may comprise one or more second drive units for rotating the rotatable portions of the mounting units 10A, 10B about the axis. Accordingly, the carriages 30 can be moved in a second direction orthogonal to the first direction. In the example shown in FIGS. 1 and 2, the second direction is a circumferential direction around the axis of the shaft 12. In this example, second drive units are provided in the main body 11 of each of the mounting units 10A and 10B to rotate the respective shafts 12. The second drive units may be configured to rotate the shafts 12 at the same speed and in the same direction.

In the example shown in FIGS. 1 and 2, the apparatus comprises legs 15 and feet 16 for supporting the main body of each mounting unit 10A, 10B on a surface, such as a workshop floor. In the example, three legs 15 are provided. However, any suitable number of legs may be used. The legs 15 may be made from a rigid material, such as metal.

In the example shown in FIGS. 1 and 2, the legs 15 are connected to the main body 11 of the apparatus by a pivoting and/or gimballed connection 17. This allows the angle of the legs 15 relative to the main body 11 to be adjusted to control the position of the main body 11. The pivoting and/or gimballed connection 17 can be fixed in a desired position to prevent further movement.

The feet 16 shown in FIGS. 1 and 2 provided a wider base for the legs 15 and are connected thereto by a similar pivoting and/or gimballed connection 18. The feet 16 may comprise apertures (not shown) for securing the feet 16 to a surface such as a workshop floor, e.g. using bolts. Accordingly the mounting units 10A, 10B can be secured in a fixed position relative to the object.

In other examples, alternative means for supporting the main body 11 may be used. For example, the main body 11 may be configured to be mounted on the object to be processed, as opposed to a surface such as a workshop floor. In one example, the main body 11 may comprise one or more clamps configured to clamp onto an edge of the object to be processed for mounting the apparatus thereon.

In the example shown in FIGS. 1 and 2, the carriages comprise a body 31, one or more bearings 32 and two apertures 33. The body 31 of the carriages 30 are configured to accommodate the processing device. The bearings 32 are configured to contact and move against a surface of the object as the carriage is moved relative to the surface. The bearings 32 may be wheels or spherical bearings (which can freely rotate about any axis), for example. The apertures 33 are configured to allow the tension member 20 to pass through.

In the example shown in FIG. 1, each carriage 30 is supported by two parts of a respective tension member 20, each of the two parts being on opposite sides of the loop formed by the tension member 20. However, the carriage 30 is fixedly connected to only one of the two parts of the tension member 20. More specifically, the tension member is looped through the apertures 33 of each carriage 20.

The tension member 20 is fixedly connected to one of the apertures 33 and allowed to move through the other aperture 33. Accordingly, the carriage 30 moves with the part of the tension member 20 to which it is fixedly connected. The aperture 33 which is not fixedly connected to the tension member 20, improves the stability of the carriage 20 because it allows the carriage 30 to be supported by two parts of the tension member 20 running substantially parallel to each other.

FIG. 3 shows a cross-section through the apparatus, specifically through the carriages 30, shown in FIGS. 1 and 2. In this example, two carriages 30 are arranged at intervals around the axis extending from one mounting unit 10A, 10B towards the other mounting unit 10B, 10A. However, in other examples more than two carriages 30 may be provided.

As shown in FIG. 3, the two carriages 30 are connected to each other by a rigid connector 34. In the case of multiple carriages, e.g. as shown in FIG. 4, each of the multiple carriages may be connected to at least one other of the multiple carriages 30 by a rigid connector 34. The rigid connector 24 may be a bar or rod, for example. The rigid connector 34 may be connected to each carriage 30 by a pivoting and/or gimballed connection 35, similar to those described above.

As shown in the example of FIG. 3, each of the carriages 30 is connected to a respective tension member 20. However, in other examples, such as the example shown in FIG. 4, one or more of the multiple carriages 30 may not be directly connected to respective tension members 20. Instead, such carriages may be connected to at least one carriage 30 that is connected to a respective tension member 20. As shown in FIG. 4, these carriages 30 may not have apertures 30. However these carriages 30 are otherwise the same as the carriages 30 described above. In the example shown in FIG. 4, carriages 30 not directly connected to respective tension members 20 may be provided between and connect to two carriages 30 connected to a respective tension member 20.

The surface of the object may be processed by arranging the apparatus adjacent to the object. Then the one or more carriages 30 may be moved, relative to the object and the object is processed using the processing device. The one or more carriages 30 may be arranged to contact the surface of the object to be processed.

In FIGS. 1 to 4, the example apparatus is shown together with a cylindrical and/or hollow object, such as part of a pressure vessel. The inner surface of the object may be processed. The tension members may pass through the object. The first drive units move the carriages 30 in an axial direction of the cylindrical object. The second drive units move the carriages 30 in a circumferential direction of the cylindrical object. The bearings 34 of the carriages move against the inner surface of the cylindrical object as the carriages 30 are moved.

Although the present disclosure has been described in terms of exemplary embodiments, it is not limited thereto. It should be appreciated that variations or modifications may be made to the embodiments described without departing from the scope of the present disclosure as defined by the claims.

I claim:

1. An apparatus for moving one or more processing devices relative to an object to be processed, comprising:
   first and second mounting units configured to be secured in a fixed position relative to the object to be processed and between which one or more tension members are mounted under tension;
   one or more carriages respectively connected to the one or more tension members, each of the carriages configured to accommodate a respective processing device; and
   a drive unit configured to move the one or more tension members so as to move the one or more carriages relative to the object,
   wherein each carriage is supported by two parts of a respective tension member, each of the two parts is on an opposite side of the loop formed by the tension member, and the carriage is fixedly connected to only one of the two parts.

2. The apparatus of claim 1, wherein the drive unit comprises:
   one or more first drive units configured to respectively drive the one or more tension members from one mounting unit towards the other mounting unit to move the carriages in a first direction.

3. The apparatus of claim 2, wherein each of the tension members are arranged in a loop around respective parts of the first and second mounting units, the first drive units being configured to drive the tension members such that the tension members move around the loop.

4. The apparatus of claim 3, wherein each first drive unit comprises a drive pulley forming part of one of the first or second mounting units and a respective tension member is looped around the drive pulley.

5. The apparatus of claim 1, wherein:
   the first and second mounting units comprise respective rotatable portions mounted so as to be rotatable about an axis extending from one mounting unit towards the other mounting unit;
   the one or more tension members are mounted to the rotatable portions; and
   the drive unit comprises one or more second drive units configured to rotate the rotatable portions about the axis.

6. An apparatus for moving one or more processing devices relative to an object to be processed, comprising:
   first and second mounting units configured to be secured in a fixed position relative to the object to be processed and between which one or more tension members are mounted under tension;
   one or more carriages respectively connected to the one or more tension members, each of the carriages configured to accommodate a respective processing device; and
   a drive unit configured to move the one or more tension members so as to move the one or more carriages relative to the object,
   wherein multiple carriages are arranged at intervals around an axis extending from one mounting unit towards the other mounting unit.

7. The apparatus of claim 6, wherein each of the carriages is connected to at least one other of the multiple carriages by a rigid connector.

8. The apparatus of claim 7, wherein the rigid connector is connected to each carriage by a pivoting and/or gimballed connection.

9. The apparatus of claim 6, wherein each of the multiple carriages is connected to at least one respective tension member.

10. The apparatus of claim 6, wherein one or more of the multiple carriages are not directly connected to respective tension members and are connected to at least one carriage which is connected to a respective tension member.

11. The apparatus of claim 7, wherein the drive unit is configured to drive the multiple carriages in the same direction at the same speed.

12. The apparatus of claim 1, wherein the one or more carriages comprise at least one bearing configured to contact a surface of the object to be processed as the one or more carriages are moved relative to the object.

13. The apparatus of claim 1, wherein the first and second mounting units are configured to be mounted on the object to be processed.

14. The apparatus of claim 1, wherein each processing device comprises one of a reflector, a sensor or a cleaning device.

15. A method of processing an object with a processing device, comprising:
   arranging an apparatus adjacent the object, the apparatus configured for moving the processing device relative to the object to be processed and including:
      first and second mounting units configured to be secured in a fixed position relative to the object to be processed and between which one or more tension members are mounted under tension;
      one or more carriages respectively connected to the one or more tension members, each of the carriages configured to accommodate the processing device; and
      a drive unit configured to move the one or more tension members so as to move the one or more carriages relative to the object,
      wherein each carriage is supported by two parts of a respective tension member, each of the two parts is on an opposite side of the loop formed by the tension member, and the carriage is fixedly connected to only one of the two parts;
   moving the one or more carriages, such that the one or more carriages move relative to the object; and
   processing the object using the processing device.

16. The method of claim 15, wherein the one or more carriages contact a surface of the object.

17. The method of claim 15, wherein the object is a pressure vessel.

18. The method of claim 16, wherein the object is hollow and the surface is an interior surface of the hollow object.

19. The method of claim 18, wherein the apparatus is arranged such that the tension members pass through the object.

* * * * *